US010745841B2

(12) United States Patent
Yoon et al.

(10) Patent No.: US 10,745,841 B2
(45) Date of Patent: Aug. 18, 2020

(54) SYSTEMS AND METHODS FOR CONTROLLING AN APPLIANCE USING ANOTHER APPLIANCE COMMUNICATIVELY COUPLED THERETO

(71) Applicant: Haier US Appliance Solutions, Inc., Wilmington, DE (US)

(72) Inventors: Je Kwon Yoon, Seongnam (KR); Woong Jeon, Hwaseong (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 71 days.

(21) Appl. No.: 16/037,173

(22) Filed: Jul. 17, 2018

(65) Prior Publication Data

US 2020/0024784 A1  Jan. 23, 2020

(51) Int. Cl.
| *D06F 34/05* | (2020.01) |
| *D06F 29/00* | (2006.01) |
| *G06F 3/0482* | (2013.01) |
| *G06F 3/0488* | (2013.01) |
| *H04L 12/28* | (2006.01) |
| *G05B 19/042* | (2006.01) |
| *D06F 33/00* | (2020.01) |
| *D06F 58/30* | (2020.01) |
| *D06F 95/00* | (2006.01) |
| *G06F 8/34* | (2018.01) |
| *D06F 39/00* | (2020.01) |

(Continued)

(52) U.S. Cl.
CPC .............. *D06F 34/05* (2020.02); *D06F 29/00* (2013.01); *D06F 29/005* (2013.01); *D06F 33/00* (2013.01); *D06F 34/00* (2020.02); *D06F 35/00* (2013.01); *D06F 39/00* (2013.01); *D06F 58/30* (2020.02); *D06F 95/00* (2013.01); *G05B 15/02* (2013.01); *G05B 19/042* (2013.01); *G06F 3/0482* (2013.01); *G06F 3/0488* (2013.01); *G06F 8/34* (2013.01); *H04L 12/282* (2013.01); *H04L 12/2816* (2013.01); *D06F 2212/02* (2013.01); *D06F 2216/00* (2013.01); *G05B 2219/2633* (2013.01)

(58) Field of Classification Search
CPC ........ D06F 29/00; D06F 29/005; D06F 35/00; D06F 39/00; D06F 39/005; D06F 58/28; D06F 95/00; D06F 33/00; D06F 58/30; H04L 12/282; H04L 2012/285; H04L 12/2816; G06F 8/34; G06F 9/54; G06F 3/0482; G06F 3/0488; G05B 15/02; G05B 2219/23258; G05B 2219/2642; G05B 19/042; A47L 15/0063; H02J 13/001; H02J 2003/143; G06Q 50/06; Y04S 10/54; G01R 21/133; G01R 22/063
See application file for complete search history.

(56) References Cited

U.S. PATENT DOCUMENTS

| 3,220,229 A | 11/1965 | Llvesay |
| 7,383,644 B2 | 6/2008 | Lyu et al. |

(Continued)

*Primary Examiner* — Crystal J Barnes-Bullock
(74) *Attorney, Agent, or Firm* — Dority & Manning, P.A.

(57) ABSTRACT

Systems and methods for controlling one appliance using another appliance communicatively coupled thereto are provided. In one example aspect, a system includes a first appliance and a second appliance communicatively coupled thereto. The first appliance includes features that allow a user to control the first appliance and the second appliance from a single user interface.

20 Claims, 8 Drawing Sheets

(51) Int. Cl.
*G05B 15/02* (2006.01)
*D06F 35/00* (2006.01)
*D06F 34/00* (2020.01)

(56) References Cited

U.S. PATENT DOCUMENTS

| | | | | |
|---|---|---|---|---|
| 7,617,702 B2* | 11/2009 | Sunshine | ............... | D06F 39/12 68/20 |
| 7,624,466 B2 | 12/2009 | Kim et al. | | |
| 7,624,600 B2* | 12/2009 | Sunshine | ............... | D06F 39/12 68/20 |
| 7,628,043 B2* | 12/2009 | Sunshine | ............... | D06F 95/00 68/20 |
| 7,735,239 B2* | 6/2010 | Jeong | ............... | D06F 58/28 34/282 |
| 7,849,717 B2* | 12/2010 | Sunshine | ............... | A47B 46/00 68/13 R |
| 8,010,211 B2* | 8/2011 | Hendrickson | ............. | F24C 7/082 700/1 |
| 8,051,381 B2* | 11/2011 | Ebrom | ................. | G05B 15/02 340/286.02 |
| 8,264,318 B2* | 9/2012 | Ebrom | ................. | G06F 9/54 340/10.1 |
| 8,314,678 B2* | 11/2012 | Ebrom | ................. | G06F 9/54 340/10.1 |
| 8,477,007 B2* | 7/2013 | McCoy | ................. | G06F 9/54 219/702 |
| 8,567,091 B2* | 10/2013 | Jeong | ................. | D06F 58/28 34/552 |
| 9,277,188 B2* | 3/2016 | Ebrom | ................. | G06F 9/54 |
| 9,828,094 B2* | 11/2017 | McMillion | ............... | B64D 1/22 |
| 2004/0006439 A1* | 1/2004 | Hunter | ................. | G01D 4/004 702/61 |
| 2004/0118008 A1* | 6/2004 | Jeong | ................. | D06F 58/28 34/425 |
| 2007/0119072 A1 | 5/2007 | Kim | | |
| 2007/0266743 A9* | 11/2007 | Sunshine | ............... | D06F 39/12 68/13 R |
| 2009/0040066 A1* | 2/2009 | Ebrom | ................. | G06F 9/54 340/4.32 |
| 2009/0044129 A1* | 2/2009 | Ebrom | ................. | G06F 8/34 715/738 |
| 2009/0044137 A1* | 2/2009 | Bartley | ................. | G06F 9/54 715/764 |
| 2010/0102051 A1* | 4/2010 | Ebrom | ................. | H04L 69/26 219/520 |
| 2011/0125337 A1* | 5/2011 | Zavadsky | ............... | G06F 1/263 700/291 |
| 2015/0267338 A1* | 9/2015 | Helms | ................. | D06F 29/005 8/137 |

* cited by examiner

SYSTEMS AND METHODS FOR CONTROLLING AN APPLIANCE USING ANOTHER APPLIANCE COMMUNICATIVELY COUPLED THERETO

FIELD OF THE INVENTION

The present disclosure relates generally to systems and methods for controlling one appliance using the controls of another appliance communicatively coupled thereto.

BACKGROUND OF THE INVENTION

Vertically stacked appliance arrangements facilitate efficient use of space. One example of a vertically stacked arrangement includes a dryer appliance stacked on top of a washing machine appliance. As another example, a vertically stacked arrangement may include a washing machine appliance stacked on top of a dryer appliance. Vertically stacked appliances present certain challenges. For instance, the controls of many consumer appliances are located at or near the top of the unit. Accordingly, reaching the controls of the stacked appliance may be difficult for some users, particularly persons of below average height. Indeed, some users must use a stepping tool or other object to reach the controls of the stacked appliance. Thus, controlling a stacked appliance may be inconvenient. In addition to vertically stacked appliance arrangements, some appliance systems or groups are arranged such that the controls of one or more of the appliances are difficult to access or reach. Controlling such difficult to access appliance may be inconvenient as well.

Accordingly, an appliance system and methods for controlling the same that address one or more of the challenges noted above would be useful.

BRIEF DESCRIPTION OF THE INVENTION

Aspects and advantages of the invention will be set forth in part in the following description, or may be apparent from the description, or may be learned through practice of the invention.

In accordance with one embodiment of the present disclosure, a system is provided. The system includes a first appliance. The first appliance includes one or more operational components. The first appliance also includes a user interface comprising one or more input selectors. Further, the first appliance includes a controller communicatively coupled with the user interface and the one or more operational components. The system also includes a second appliance. The second appliance includes one or more operational components for operating the second appliance in a cycle, the one or more operational components of the second appliance communicatively coupled with the controller of the first appliance. The controller of the first appliance is configured to: receive a control input associated with a user input to the one or more input selectors of the user interface of the first appliance; generate a control command based at least in part on the control input, wherein the control command is representative of instructions for controlling the one or more operational components of the second appliance; and communicate the control command to the second appliance so that the one or more operational components of the second appliance operate the second appliance in the cycle.

In accordance with another embodiment of the present disclosure, a method for controlling a second appliance using a first appliance communicatively coupled thereto is provided. The method includes receiving, at a user interface of the first appliance, a control input associated with a user input to one or more input selectors of the user interface of the first appliance. The method also includes generating, by a controller communicatively coupled with the user interface, a control command based at least in part on the control input, wherein the control command is representative of instructions for activating one or more operational components of the second appliance. Further, the method includes activating the one or more operational components of the second appliance based at least in part on the control command.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
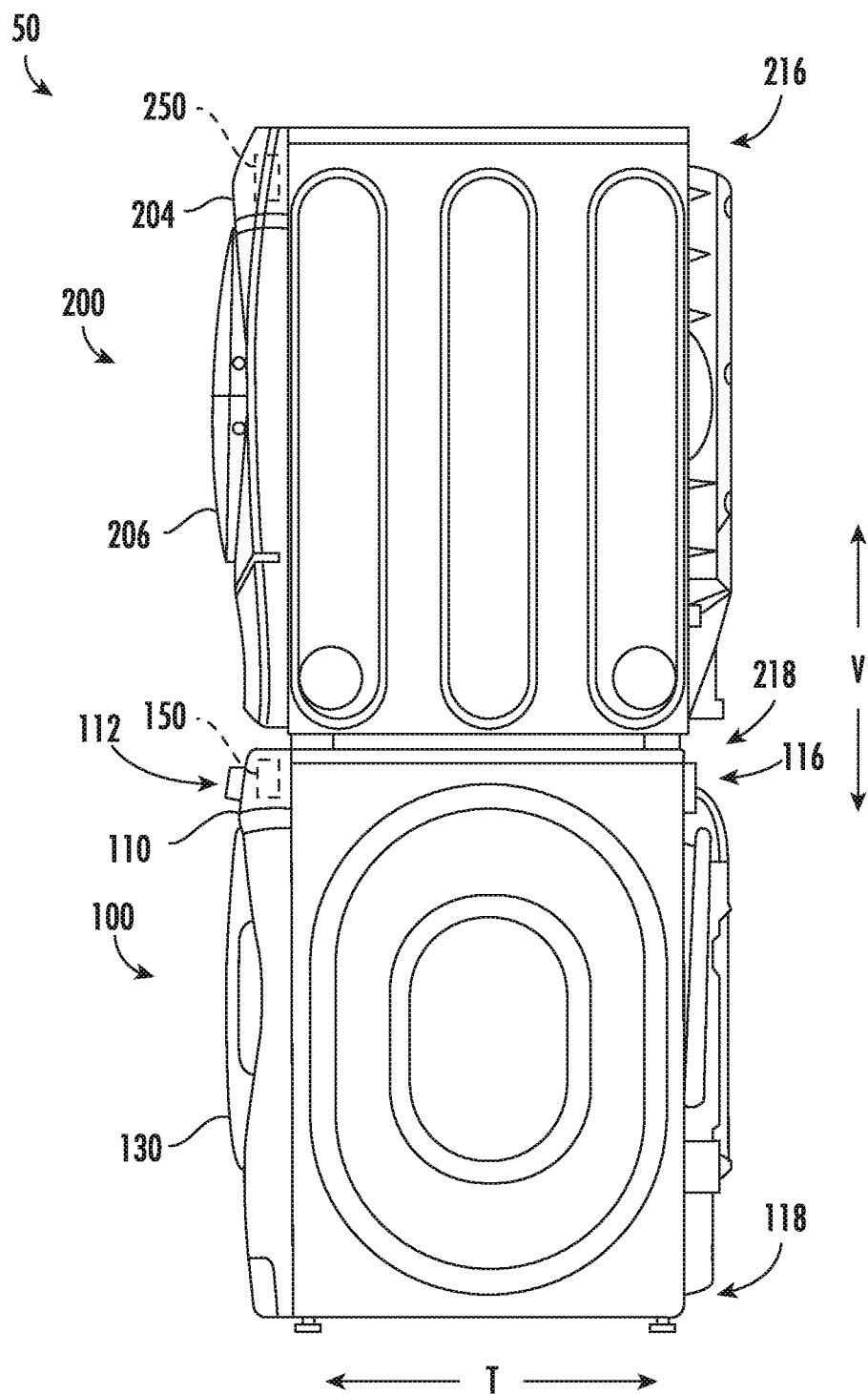
FIG. 1 provides a side view of an appliance system that includes a dryer appliance stacked on a washing machine appliance in accordance with an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
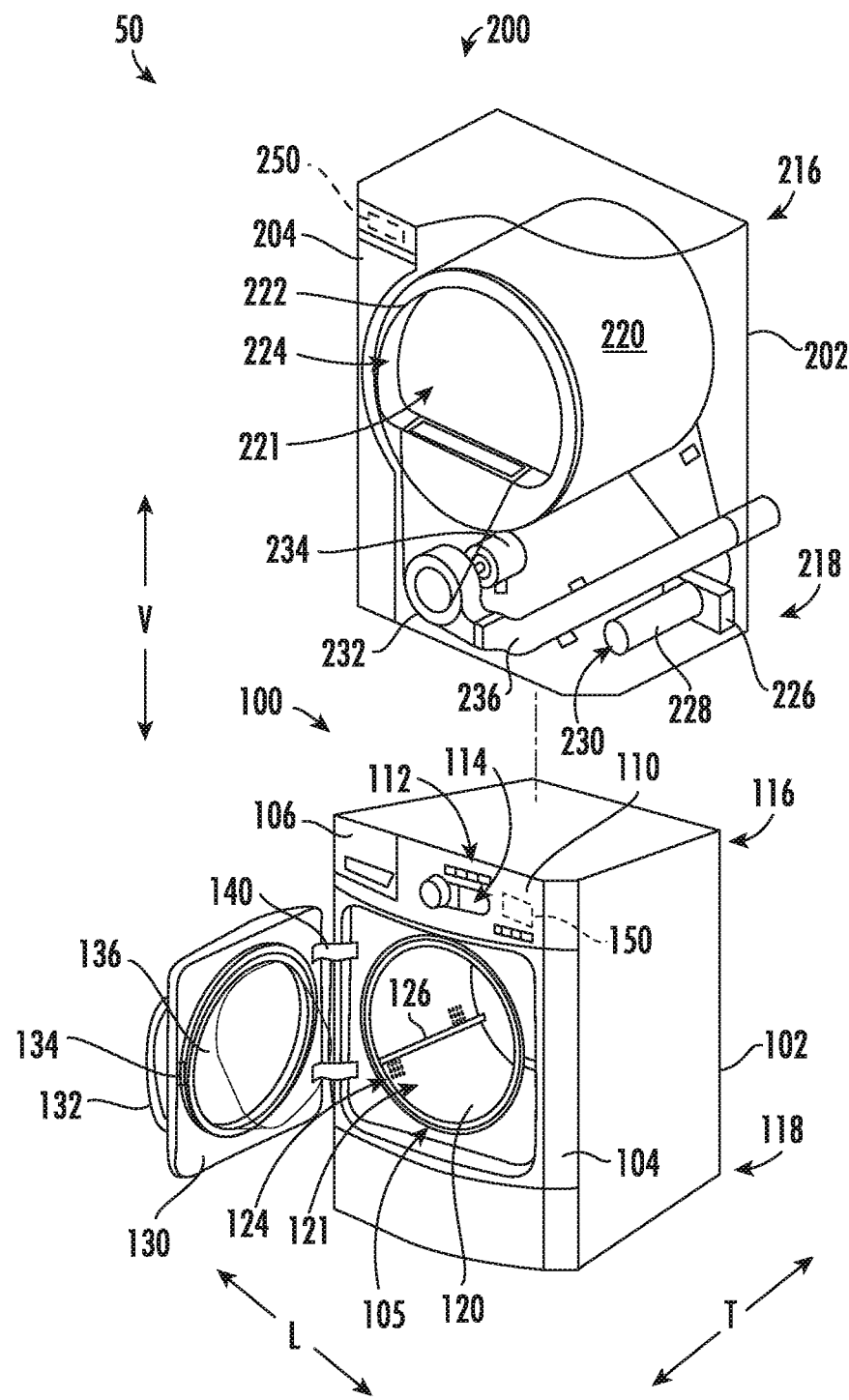
FIG. 2 provides an exploded, perspective view of the appliance system of FIG. 1 depicting a door of the washing machine appliance in an open position and the dryer appliance shown partially cutaway.

FIGS. 1 and 2 provide an exemplary appliance system 50 in accordance with an exemplary embodiment of the present subject matter. In particular, FIG. 1 provides a side elevation view of appliance system 50 and FIG. 2 provides an exploded, perspective view of appliance system 50. As shown, appliance system 50 includes a first appliance and a second appliance. For this embodiment, the first appliance is a washing machine appliance 100 and the second appliance is a dryer appliance 200 stacked thereon. Generally, appliance system 50 defines a vertical direction V, a lateral direction L, and a transverse direction T. The vertical direction V, lateral direction L, and transverse direction T are mutually perpendicular and form an orthogonal direction system.

The exemplary washing machine appliance 100 depicted in FIGS. 1 and 2 is a horizontal axis washing machine appliance. However, while described in the context of a specific embodiment of horizontal axis washing machine appliance 100 arranged in a stacked fashion with dryer appliance 200, using the teachings disclosed herein it will be understood that horizontal axis washing machine appliance 100 is provided by way of example only. Other washing machine appliances having different configurations, different appearances, and/or different features may also be utilized with the present subject matter as well. In addition, the teachings disclosed herein are applicable to other appliances as well, e.g., a dishwasher appliance, microwaves, water heaters, ovens, cooktops, etc.

Washing machine appliance 100 has a cabinet 102 with a drum 120 rotatably mounted therein. Cabinet 102 extends between a top 116 and a bottom 118, e.g., along the vertical direction V. Cabinet 102 also extends between a first side and a second side, e.g., along the lateral direction L, and between a front portion and a rear portion, e.g., along the transverse direction T. A motor (not shown) is in mechanical communication with drum 120 in order to selectively rotate drum 120 (e.g., during an agitation or a rinse cycle of washing machine appliance 100). Drum 120 defines a wash chamber 121 that is configured for receipt of articles for washing. Ribs 126 extend from drum 120 into wash chamber 121. Ribs 126 assist with agitation of articles disposed within wash chamber 121 during operation of washing machine appliance 100. For example, ribs 126 may lift articles disposed in drum 120 during rotation of drum 120. Drum 120 also defines a plurality of holes 124. Holes 124 are configured to permit a flow of wash fluid between an interior of drum 120 and an exterior of drum 120 (e.g., between drum 120 and a tub of washing machine appliance 100).

Cabinet 102 of washing machine appliance 100 has a front panel 104. A drawer 106 is slidably mounted within front panel 104. Drawer 106 receives detergent and/or other fluid additives (e.g., fabric softener or bleach) and directs the fluid additive to wash chamber 121 during operation of washing machine appliance 100. Front panel 104 defines an opening 105 or loading opening that permits user access to wash chamber 121 of drum 120. A door 130 is rotatably mounted to front panel 104 with a hinge 140. Door 130 permits selective access to wash chamber 121. A window 136 in door 130 permits viewing of wash chamber 121, e.g., during operation of washing machine appliance 100. Door 130 also includes a handle 132 that a user may pull when opening and closing door 130. Latch striker 134 is configured for selectively securing door 130 to a latch (not labeled) when door 130 is in a closed position.

Front panel 104 also includes a user interface panel 110. User interface panel 110 includes a plurality of input selectors 112 and a display 114. Display 114 of user interface panel 110 indicates selected features, a countdown timer, and/or other items of interest to appliance users. In some embodiments, display 114 is a touchscreen, such as e.g., an LCD touchscreen. Input selectors 112 and display 114 collectively provide an interface for users to provide user inputs for operator selection of machine cycles and features. Particularly, in accordance with exemplary aspects of the present disclosure, input selectors 112 and display 114 of user interface panel 110 collectively provide an interface for users to provide user inputs for operator selection of machine cycles and features of washing machine appliance 100 and dryer appliance 200.

Operation of washing machine appliance 100 is controlled by a controller 150 that is communicatively coupled with various components of user interface panel 110. In this way, when a user manipulates input selectors 112 or display 114 to select washing machine cycles and features as well as various cycles and features of dryer appliance 200, controller 150 operates the various components of washing machine appliance 100 and/or dryer appliance 200 to execute selected machine cycles and features.

In some example embodiments, controller 150 may include one or more memory devices and one or more processing devices, such as general or special purpose microprocessors operable to execute programming instructions or micro-control code associated with operating washing machine appliance 100 and/or dryer appliance 200. The memory device (i.e., memory) may represent random access memory, such as e.g., DRAM, or read only memory such as EEPROM or FLASH. In some embodiments, the one or more processing devices execute programming instructions stored in memory. The memory may be a separate component from the processor or may be included onboard within the processor. The memory can store information accessible to processing device, including instructions that can be executed by processing device. Optionally, the instructions can be software or any set of instructions that, when executed by the processing device, cause the one or more processing devices to perform operations. For certain embodiments, the instructions include a software package configured to operate washing machine appliance 100 and/or dryer appliance 200 and interpret one or more electrical signals. For example, the instructions may include a software package configured to execute commands based on feedback from user controls as described more fully below. Controller 150 may be positioned in a variety of locations throughout washing machine appliance 100. As illustrated in FIG. 2, controller 150 is located proximate user interface panel 110 of washing machine appliance 100. In such embodiments, input/output ("I/O") signals may be routed between controller 150 and various operational components of washing machine appliance 100 and/or dryer appliance 200.

Washing machine appliance 100 may be operated in a wash cycle in the following exemplary manner. Laundry items are loaded into wash chamber 121, and washing operation is initiated through operator manipulation of input selectors 112. Drum 120 is filled with water and detergent to form a wash fluid. One or more valves (not shown) can be controlled by washing machine appliance 100 to fill drum 120 to the appropriate level for the amount of articles being washed. Once drum 120 is filled with fluid to the desired level, the laundry items within wash chamber 121 are agitated with rotation of drum 120 and ribs 126 for cleansing the laundry items.

After the agitation phase of the wash cycle is completed, wash fluid is drained from drum 120. Laundry articles can then be rinsed by again adding fluid to drum 120, depending on the cleaning cycle selected by a user, ribs 126 and rotation of drum 120 may again provide agitation within wash chamber 121. One or more spin cycles may also be used. In particular, a spin cycle may be applied after the wash cycle and/or after the rinse cycle in order to wring wash fluid from the articles being washed. During a spin cycle, drum 120 is rotated at relatively high speeds.

The exemplary dryer appliance 200 of appliance system 50 depicted in FIGS. 1 and 2 is a front load or horizontal axis dryer appliance. However, while described in the context of a specific embodiment of horizontal axis dryer appliance 200 arranged in a stacked fashion or manner with washing machine appliance 100, using the teachings disclosed herein it will be understood that horizontal axis dryer appliance 200 is provided by way of example only. Other dryer appliances having different configurations, different appearances, and/or different features may also be utilized with the present subject matter as well.

Dryer appliance 200 has a cabinet 202 and a drum 220 rotatably mounted therein. Particularly, drum 220 is mounted for rotation about a substantially horizontal axis (i.e., an axis that is substantially orthogonal to the vertical direction V). A motor (not shown) is in mechanical communication with drum 220 in order to selectively rotate drum 220 (e.g., during a drying cycle of dryer appliance 200). Drum 220 defines a drying chamber 221 that is configured for receipt of articles for drying. Tumbling ribs may extend from drum 220 into drying chamber 221 for tumbling of laundry articles during a drying cycle. Drum 220 is generally cylindrical in shape, having an imperforate outer cylindrical wall and a front flange or wall 222 defining an opening 224 to drum 220 for loading and unloading of laundry articles.

Cabinet 202 extends between a top 216 and a bottom 218, e.g., along the vertical direction V. Cabinet 202 also extends between a first side and a second side, e.g., along the lateral direction L, and between a front portion and a rear portion, e.g., along the transverse direction T. Cabinet 202 of dryer appliance 200 has a front panel 204. Various drawers may be slidably mounted within front panel 204. A door 206 (FIG. 1) is rotatably mounted to front panel 204, e.g., with a hinge. Door 206 permits selective access to drying chamber 221. A window in door 206 permits viewing of drying chamber 221, e.g., during operation of dryer appliance 200. Door 206 also includes a handle that a user may pull when opening and closing door 206. A latch assembly is configured for selectively securing door 206 in a closed position.

Furthermore, drum 220 includes a rear wall rotatably mounted with cabinet 202 by a suitable bearing. The rear wall of drum 220 defines a plurality of holes or apertures that receive hot air that has been heated by an electric heater 226 in communication with an air supply duct 228 and duct inlet 230. The air is moved from drum 220 by a blower fan 232, which is driven by a blower motor 234. The air may pass through a screen filter configured for trapping lint particles. As the air passes through the screen filter, the air enters a trap duct seal and is passed out of the clothes dryer through an exhaust duct 236. After the clothing articles have been dried, they are removed from drum 220 via opening 224.

Moreover, in some embodiments, front panel 204 also includes a user interface panel. The user interface panel may include a plurality of input selectors and/or a display. The display of the user interface panel of dryer appliance 200 may indicate selected features, a countdown timer, and/or other items of interest to appliance users. In some embodiments, the display is a touchscreen, such as e.g., an LCD touchscreen. The input selectors and display may collectively provide an interface for users to provide user inputs for operator selection of machine cycles and features. For this embodiment, operation of dryer appliance 200 is controlled at least in part by a processing device 250 that is communicatively coupled with controller 150 of washing machine appliance 100. In some exemplary embodiments, in response to user manipulation of user interface panel 110, controller 150 of washing machine appliance 100 generates and communicates a control command that is routed to processing device 160, which in turn causes one or more operational components of dryer appliance 200 to execute selected machine cycles and features. In some embodiments, however, dryer appliance 200 does not include a user interface panel. In yet other embodiments, dryer appliance 200 includes only a processing device 250 without a display or input selectors.

Figure 3:
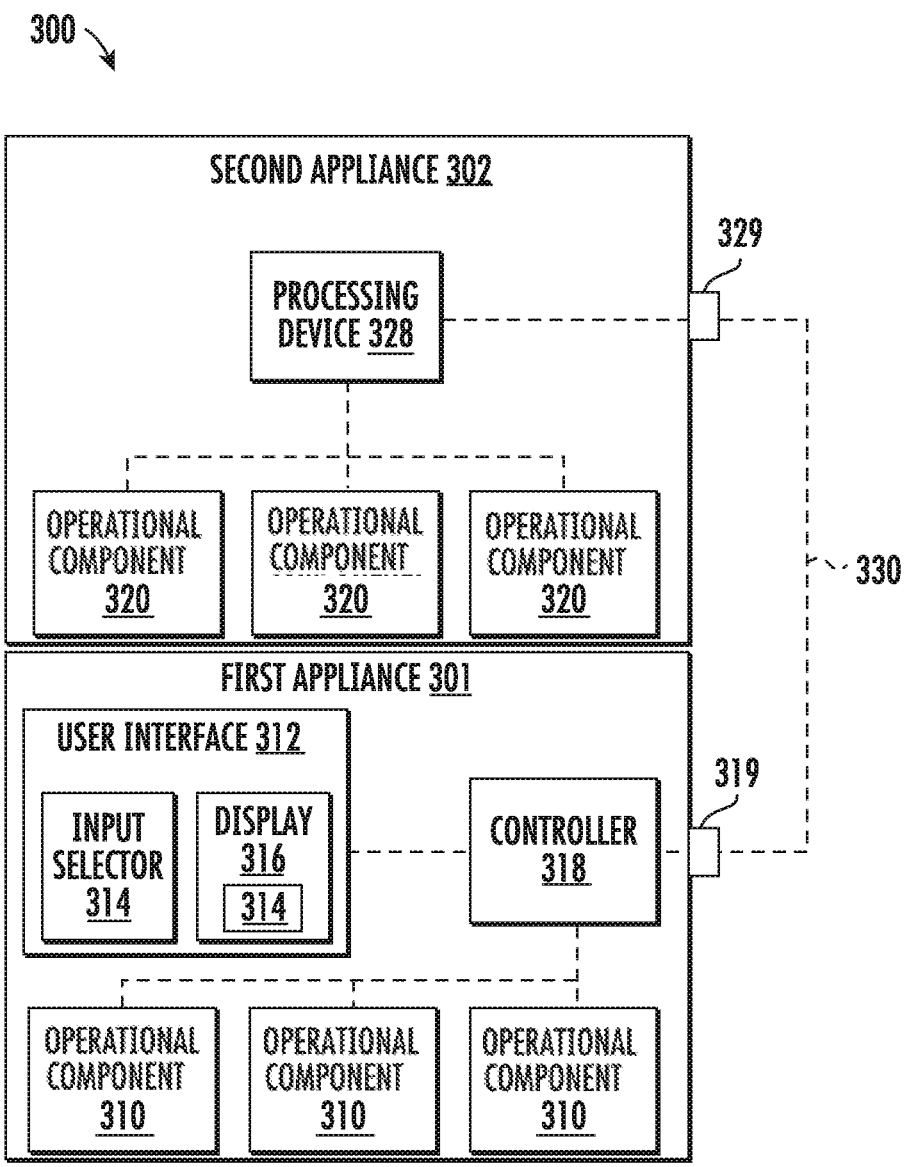
FIG. 3 provides a schematic, block diagram of one exemplary appliance system in accordance with exemplary aspects of the present disclosure.

FIG. 3 provides a schematic, block diagram of one exemplary appliance system 300 in accordance with exemplary aspects of the present disclosure. For this embodiment, appliance system 300 includes a first appliance 301 and a second appliance 302 stacked thereon. For instance, system 300 may be the appliance system 50 of FIGS. 1 and 2 and first appliance 301 and second appliance 302 may be the washing machine appliance 100 and dryer appliance 200 thereof, respectively. In such embodiments, the washing machine appliance defines vertical direction V, and in such embodiments, the dryer appliance is stacked on top of the washing machine appliance along the vertical direction V, e.g., as shown in FIG. 3. In some embodiments, the washing machine appliance defines lateral direction L. In such embodiments, the dryer appliance is positioned adjacent the washing machine appliance along the lateral direction L. That is, the washing machine appliance and dryer appliance may be placed side-by-side. It will be appreciated that system 300 is not limited in scope to the washing machine and dryer appliances of FIGS. 1 and 2. First appliance 301 may be any type of appliance and second appliance 302 may be any type of appliance. For instance, in some embodiments, first appliance 301 is dryer appliance 200 and second appliance 302 is washing machine appliance 100. In some embodiments, first appliance 301 is dryer appliance 200 and second appliance 302 is also dryer appliance 200. In some embodiments, first appliance 301 is an oven appliance and second appliance 302 is a microwave appliance. First and second appliances 301, 302 may be other suitable appliances as well.

Generally, appliance system 300 includes features that allow a user to control second appliance 302 from or using controls of first appliance 301. First appliance 301 includes one or more operational components 310 configured for performing a duty cycle, e.g., a wash cycle. For instance, in embodiments in which first appliance 301 is a washing machine appliance, operational components 310 may include a motor for rotating drum 120 (FIG. 2) about its axis of rotation and/or display 114 (FIG. 2) for displaying relevant duty cycle information to a user. Although three (3) operational components 310 are shown in FIG. 3, first appliance 301 may include any suitable number of operational components 310. First appliance 301 also includes a user interface 312 that includes one or more input selectors 314. In some exemplary embodiments, input selectors 314 may be rotary dials, push buttons, or one or more touchscreen inputs. In some embodiments, user interface 312 of first appliance 301 also includes one or more displays 316. One or all of the displays 316 may be touchscreen displays in which a user may push or touch to control various aspects of first appliance 301, and in some instances, second appliance 302. As further shown in FIG. 3, first appliance 301 includes a controller 318 communicatively coupled with user interface 312 and the operational components 310. First appliance 301 may be communicatively coupled with user interface 312 and operational components 310 in any suitable manner, e.g., by a suitable wireless or wired connection.

Controller 318 may include a memory and processor, such as a general or special purpose microprocessor operable to execute programming instructions or micro-control code associated with a cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 318 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Second appliance 302 includes one or more operational components 320 for performing a duty cycle, e.g., a drying cycle. For instance, in embodiments in which second appliance 302 is a dryer appliance, operational components 320 may include a motor for rotating drum 220 (FIG. 2) about its axis of rotation or for electrically powering electric heater 226, blower fan 232, and/or motor 234 (FIG. 2) to execute or perform the duty cycle of second appliance 302. Although three (3) operational components 320 are shown in FIG. 3, second appliance 302 may include any suitable number of operational components 320. As further shown in FIG. 3, second appliance 302 includes a processing device 328 for controlling the one or more operational components 320 of second appliance 302. Generally, processing device 328 is configured to run a high-level operating system for processing inputs from various control commands, e.g., received from controller 318, and causing the operational components 320 to perform various operations and functions, e.g., to perform a duty cycle. Further, processing device 328 may process various feedback signals from the operational components 320 and one or more sensors of second appliance 302. Such feedback may be routed from processing device 328 to controller 318 of first appliance 301.

Processing device 328 may be communicatively coupled with operational components 320 in any suitable manner, e.g., by a suitable wireless or wired connection. In addition, processing device 328 is communicatively coupled with controller 318 of first appliance 301. In this way, first appliance 301 is communicatively coupled with second appliance 302. First appliance 301 can be communicatively coupled with second appliance 302 in any suitable manner. For instance, in this exemplary embodiment, an Ethernet or LAN (Local Area Network) cable 330 connects a first connection port 319 of first appliance 301 with a second connection portion 329 of second appliance 302. The first and second connection ports 319, 329 may each be RJ45 ports, for example. In some embodiments, cable 330 may be another suitable type of cable, such as e.g., an RS-232 cable. In some alternative embodiments, second appliance 302 does not include processing device 328. In such embodiments, the one or more operational components 320 of second appliance 302 are communicatively coupled directly with controller 318 of first appliance 301.

Figure 4:
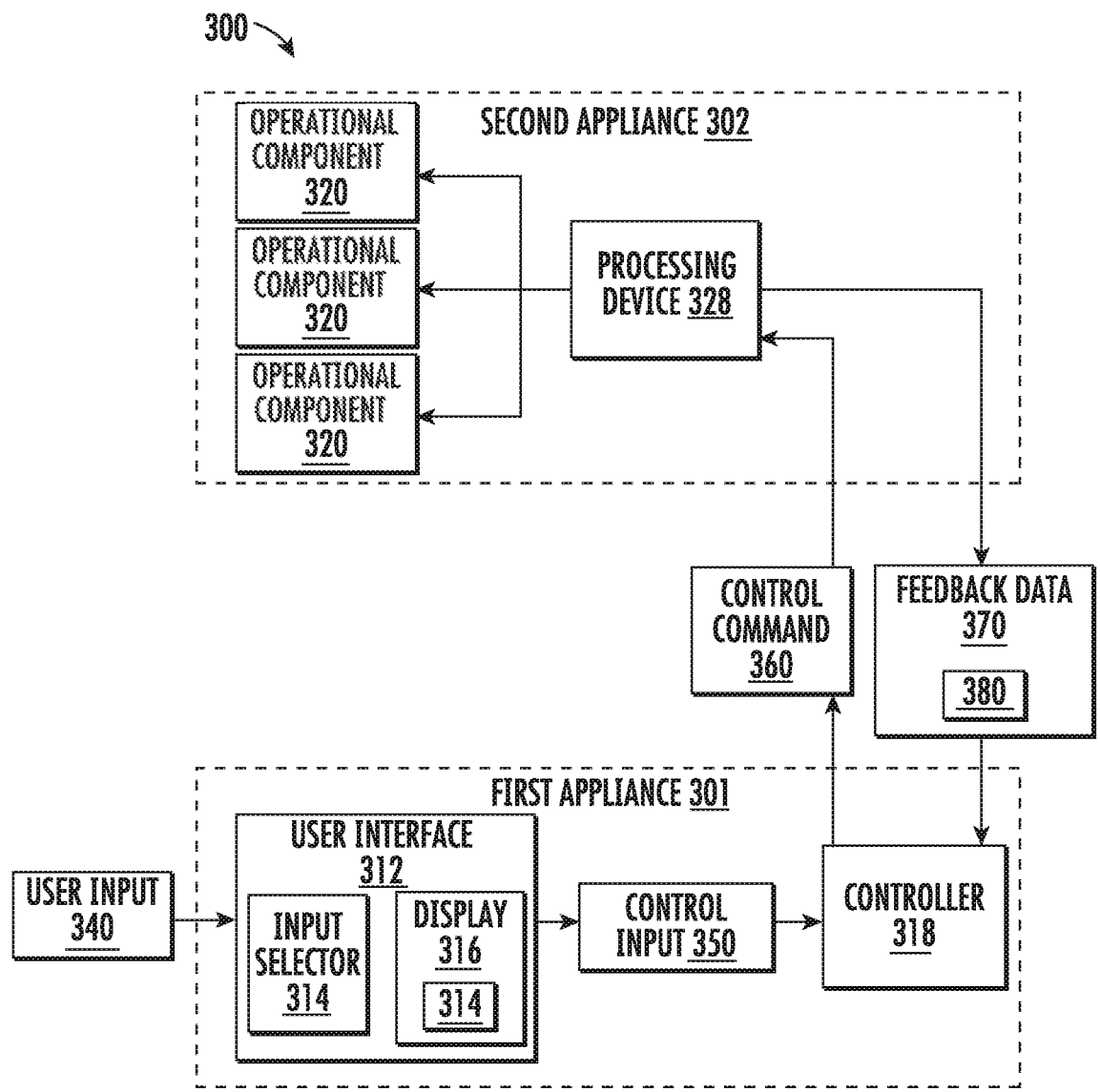
FIG. 4 provides an exemplary flow diagram of an exemplary manner in which a first appliance may be used to control a second appliance in accordance with exemplary aspects of the present disclosure.

FIG. 4 provides an exemplary flow diagram of appliance system 50 depicting an exemplary manner in which first appliance 301 may be used to control second appliance 302. As shown, a user may provide a user input 340 by manipulating one or more input selectors 314 of user interface 312. As one example, input selector 314 may be a rotary dial and a user may turn or rotate the dial to provide user input 340. As another example, input selector 314 may be an icon of display 316 and a user may push or touch the icon to provide user input 340. In some instances, to initiate certain tasks or cycles of first and/or second appliance 301, 302, multiple user inputs 340 may be required. For instance, a user may be required to touch multiple icons of display 316 to initiate a cycle of second appliance 302.

Based at least in part on the user input 340 from the user, a control input 350 is routed to controller 318. As one example, rotation of a rotary dial may generate a signal that is routed to controller 318 as control input 350. As another example, a touch input to an icon of display 316 may generate a signal that is routed to controller 318 as control input 350. Controller 318 of first appliance 301 is configured to receive control input 350 associated with user input 340 to the user interface 312. As noted above, controller 318 may receive multiple control inputs 350. Once the necessary control inputs 350 are received, controller 318 generates a control command 360 based at least in part on the control input 350 or inputs. The control command 360 is representative of instructions for controlling the one or more operational components 320 of the second appliance 302. For example, the control command 360 may be representative of activating a motor and setting the speed output of the motor such that drum 220 (FIG. 2) rotates at a particular rotational speed. The control command 360 may also be representative of setting various outputs of electric heater 226, blower fan 232, and/or motor 234 (FIG. 2) of second appliance 302. Further, in some embodiments, additionally or alternatively, control command 360 is representative of instructions for controlling the one or more operational components 310 of the first appliance 301.

After controller 318 generates the control command 360, controller 318 communicates the control command 360 to second appliance 302 so that the one or more operational components 320 of the second appliance 302 operate the second appliance 302 in a cycle. For the depicted embodiment of FIG. 4, controller 318 is configured to communicate the control command 360 to processing device 328. Processing device 328 is configured to receive the control command 360 communicated from the controller 318 of the first appliance 301. Processing device 328 is also configured to activate the one or more operational components 320 of second appliance 302 to operate second appliance 302 in the cycle based at least in part on the control command 360 received from controller 318 of first appliance 301. In some alternative embodiments, controller 318 of first appliance 301 communicates the control command 360 directly to the operational components 320 of second appliance 302. Thus, in such embodiments, controller 318 directly activates the operational components 320 of second appliance 302, e.g., to perform various tasks or to operate second appliance 302 in a cycle, e.g., a drying cycle.

In some exemplary embodiments, controller 318 of first appliance 301 is further configured to determine whether the control input 350 is directed to controlling first appliance 301 or the second appliance 302. In such embodiments, controller 318 generates the control command 360 based at least in part on whether the control input 350 is directed to controlling the first appliance 301 or the second appliance 302. For instance, if the first appliance 301 includes one input selector 314 associated with controlling the first appliance 301 and one input select 314 associated with controlling the second appliance 302, controller 318 determines whether the control input 350 is directed to controlling first appliance 301 or the second appliance 302 based on the input selector manipulated by the user. Further examples are provided below.

Figure 5:
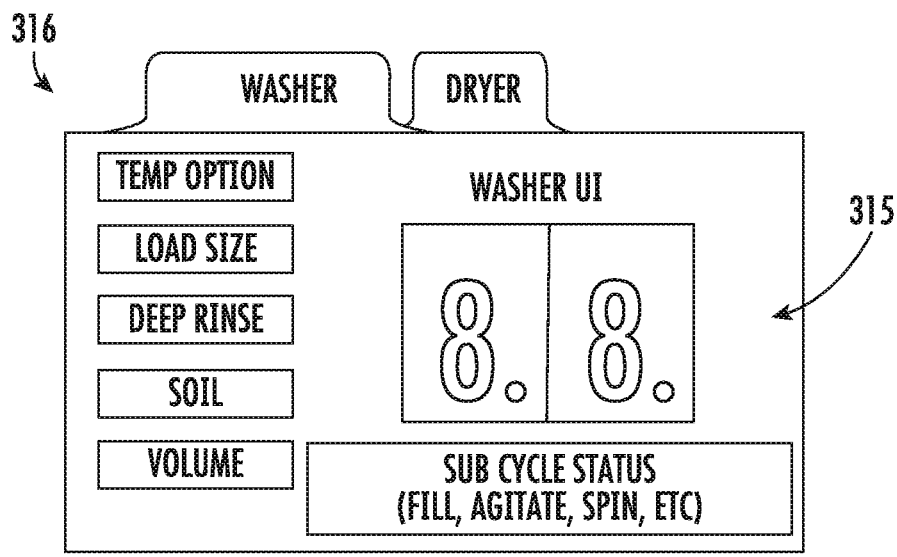
FIGS. 5 and 6 provide close up views of an exemplary touchscreen of user interface of first appliance in accordance with exemplary embodiments of the present disclosure.
Figure 6:
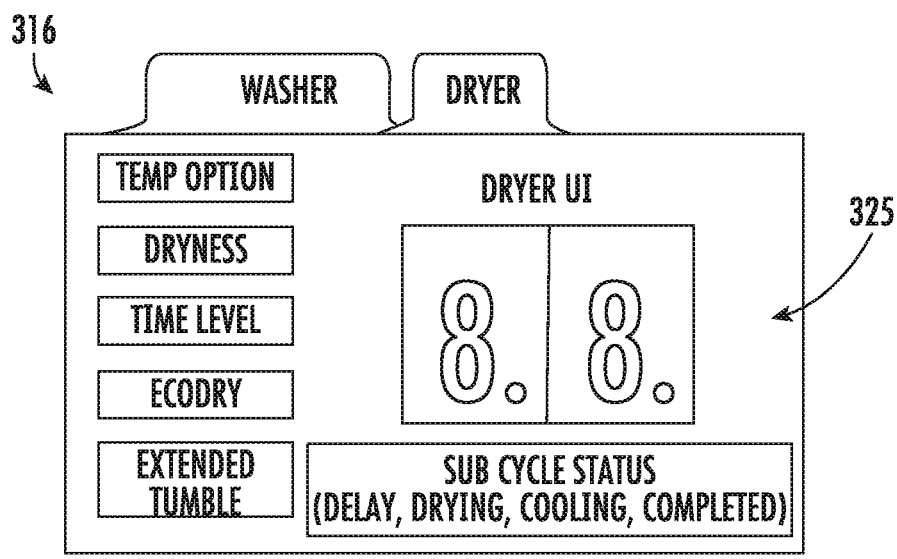

FIGS. 5 and 6 provide close up views of an exemplary display 316 of the user interface of the first appliance in accordance with exemplary embodiments of the present disclosure. For this exemplary embodiment, first appliance 301 (FIGS. 3 and 4) is a washing machine appliance and second appliance 302 (FIGS. 3 and 4) is a dryer appliance. Further, for this exemplary embodiment, display 316 is a touchscreen communicatively coupled with controller 318 (FIGS. 3 and 4). As shown, touchscreen is switchable between a first appliance tab 315 (FIG. 5) and a second appliance tab 325 (FIG. 6). A user may provide a touch input to select the desired tab to switch between the various appliances of appliance system 300 (FIG. 3). When first appliance tab 315 is selected as shown in FIG. 5, various indicia are presented, including for example, the appliance selected, a timer or countdown, a cycle status, and various cycle options or modes. Other indicia may be presented as well. When second appliance tab 325 is selected as shown in FIG. 6, various indicia are presented, including for example, the appliance selected, a timer or countdown, a cycle status, and various cycle options or modes. In such embodiments, controller 318 of first appliance 301 determines whether the control input, which in this example is a touch input to touchscreen, is directed to controlling first appliance 301 or controlling second appliance 302 by ascertaining whether the touch input to the touchscreen occurred while the first appliance tab 315 was presented or while the second appliance tab 325 was presented. That is, if the screen is touched while the first appliance tab 315 is presented, controller 318 determines that the control input 350 (FIG. 4) is directed to first appliance 301 and the control command 360 is generated accordingly. If, on the other hand, the screen is touched while the second appliance tab 325 is presented, controller 318 determines that the control input 350 (FIG. 4) is directed to second appliance 302 and the control command 360 is generated accordingly.

In other exemplary embodiments, with reference again to FIG. 4, user interface 312 of first appliance 301 includes display 316. More particularly, for this exemplary embodiment, display 316 is a touchscreen communicatively coupled with controller 318. In such embodiments, the user input 340 is a touch input to the touchscreen and controller 318 of first appliance 301 determines whether the control input 350 is directed to controlling the first appliance 301 or controlling the second appliance 302 by ascertaining a location of the touch input to the touchscreen. As one example, the left side of the touchscreen may include various icons for controlling first appliance 301 and the right side of the touchscreen may include various icons for controlling second appliance 302. Thus, when the touchscreen is pressed by a user (i.e., the user provides a touch input), controller 318 determines the location of the touch input, and based on the location of the touch input on or to the screen, controller 318 associates the control input 350 with one of the appliances of system 300 and generates the control command 360 based at least in part on whether the control input 350 is directed to controlling the first appliance 301 or the second appliance 302. In this example, if one of the icons on the left side of the screen is touched, controller 318 associates the control input 350 with first appliance 301 and generates the control command 360 accordingly. On the other hand, if one of the icons on the right side of the screen is touched, controller 318 associates the control input 350 with second appliance 302 and generates the control command 360 accordingly. Further, in other embodiments, a user may swap between controlling first and second appliance 301, 302 by using multi-finger touches or multi-page screens.

In some embodiments, user interface 312 of first appliance 301 includes display 316 communicatively coupled with controller 318, as previously noted. In such embodiments, after controller 318 communicates the control command 360 to second appliance 302 so that the one or more operational components 320 of the second appliance 302 operate second appliance 302 in the cycle, controller 318 of first appliance 301 is further configured to receive, in real time, feedback data 370 indicative of a cycle state 380 of the cycle being performed by second appliance 302. Moreover, controller 318 is further configured to activate display 316 to present an indicia representative of the cycle state 380 of the cycle being performed by second appliance 302. For instance, the cycle state 380 may be presented below the countdown timer as shown in FIG. 6.

As one example, the feedback data 370 indicative of the cycle state may include data relating to the operational status or component state of the motor driving drum 220 (FIG. 2) about its axis of rotation, electric heater 226, blower fan 232, and/or motor 234 (FIG. 2) of second appliance 302. The operational status or component state presented at display 316 may include, for example, a rotational speed of drum 220, a temperature of electric heater 226, the rotational speed of blower fan 232, or the output of motor 234. As another example, the feedback data indicative of the cycle state of the cycle being operated by the second appliance may include information relating to the cycle options selected by the user, the time remaining on the cycle, and other useful information.

Figure 7:
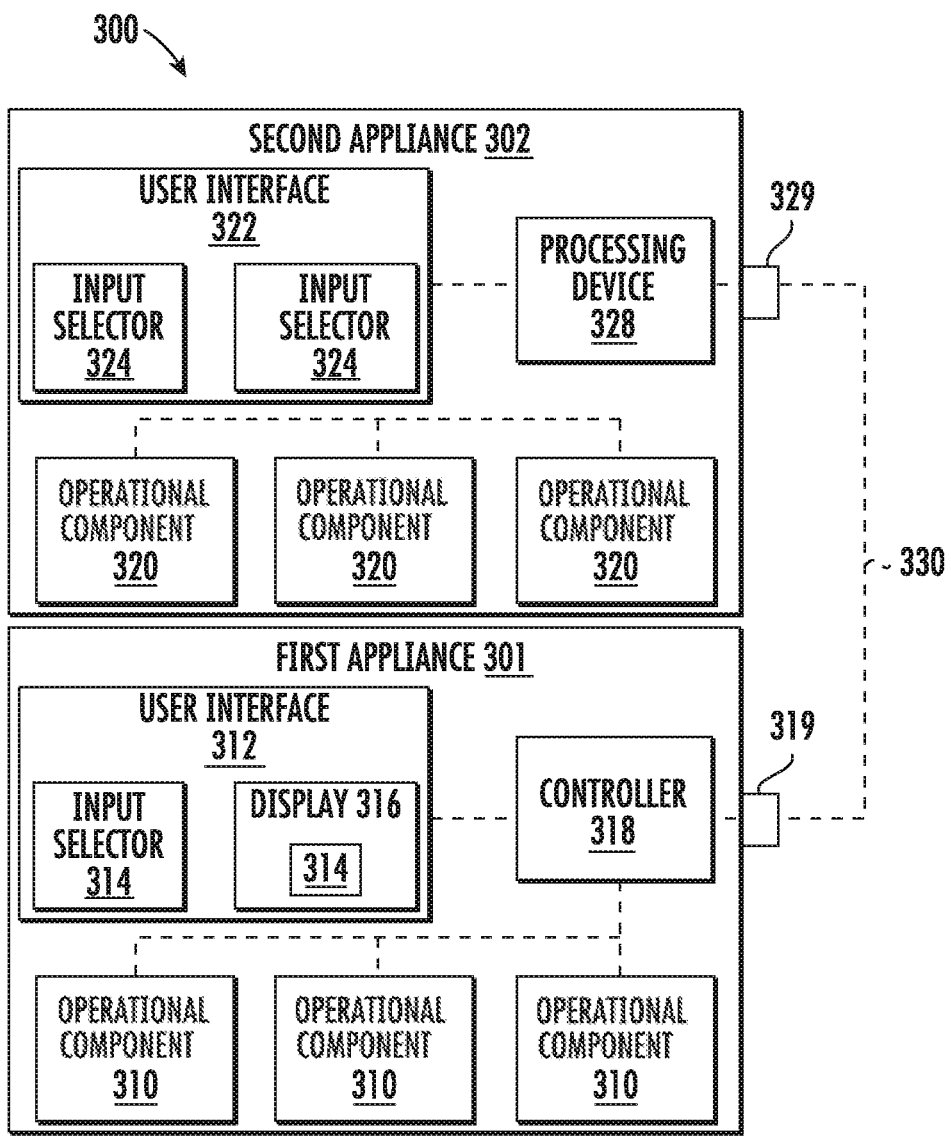
FIG. 7 provides a schematic, block diagram of another exemplary appliance system in accordance with exemplary aspects of the present disclosure.

FIG. 7 provides a schematic, block diagram of another exemplary appliance system 300 in accordance with exemplary aspects of the present disclosure. The exemplary appliance system 300 of FIG. 7 is configured in a similar manner as the appliance system 300 of FIG. 3, and accordingly, the same or similar numbering refers to the same or similar part. By contrast with the appliance system of FIG. 3, second appliance 302 of appliance system 300 of FIG. 7 includes a user interface 322 communicatively coupled with processing device 328. For this embodiment, however, user interface 322 has minimal input selectors. In particular, user interface 322 has two (2) input selectors 324. For instance, one input selector 324 may be a power/cancel push button and the other input selector 324 may be a start/pause push button. In some embodiments, user interface 322 of second appliance 302 includes no more than two (2) input selectors. In some embodiments, user interface 322 includes at least two (2) input selectors. Further, in some embodiments, user interface 322 of second appliance 302 is positioned at front panel 204 of second appliance 302 at bottom 218 of second appliance 302 (FIG. 2). Advantageously, the limited number of input selectors 324 of second appliance 302 may reduce the cost of user interface 322 of second appliance 302 and may provide a user with a means of quickly canceling or starting a cycle of second appliance 302. Further, the appliance system 300 still provides a user with a means to select various parameters of the cycle of second appliance 302 at user interface 312 of first appliance 301.

In some embodiments, a user may provide a user input by manipulating one or more input selectors 324 of user interface 322. Input selectors 324 may be any of the example input selectors 314 noted herein. Based at least in part on the user input from the user, a control input is routed to processing unit 328. Processing device 328 of second appliance 302 is configured to receive the control input associated with user input to the user interface 322. Once the necessary control inputs are received by processing device 328, processing device 328 activates the one or more operational components 320 of second appliance 302 to operate the second appliance 302 in a cycle. Processing device 328 may also route a signal to controller 318 indicating that a user has selected a cycle and that second appliance 302 is operating in the cycle.

Figure 8:
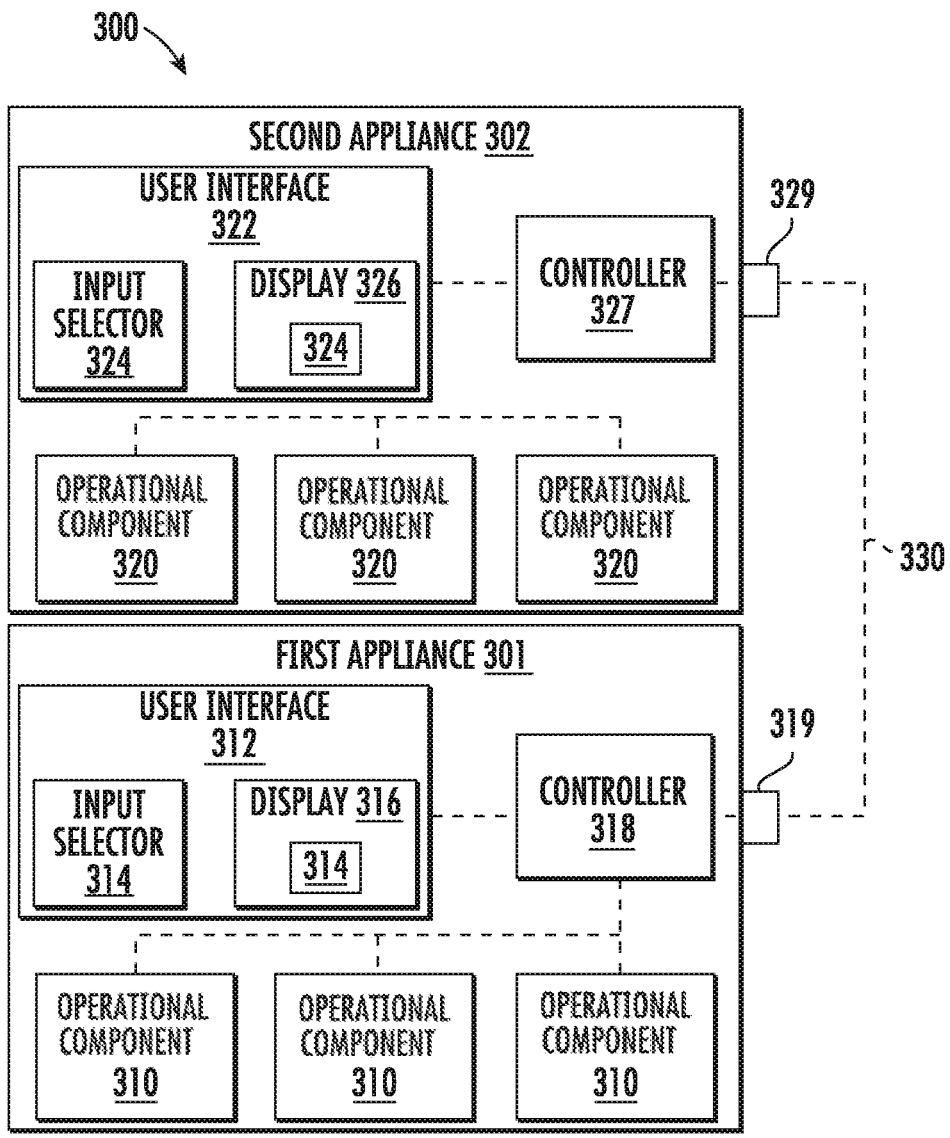
FIG. 8 provides a schematic, block diagram of yet another exemplary appliance system in accordance with exemplary aspects of the present disclosure.

FIG. 8 provides a schematic, block diagram of yet another exemplary appliance system 300 in accordance with exemplary aspects of the present disclosure. The exemplary appliance system 300 of FIG. 8 is configured in a similar manner as the appliance system 300 of FIG. 3, and accordingly, the same or similar numbering refers to the same or similar part. By contrast with the appliance system of FIG. 3, second appliance 302 of appliance system 300 of FIG. 8 includes a user interface 322 communicatively coupled with a controller 327 of second appliance 302. Controller 327 may be configured in the same or similar manner as controller 318 of first appliance 301. Moreover, user interface 322 of second appliance 302 of FIG. 8 may include any of the features of user interface 312 of first appliance 301 described herein.

In some embodiments, when second appliance 302 is communicatively coupled to first appliance 301, e.g., via LAN cable 330 and RJ45 connection ports, one or both of the appliances may present a "combined control option" to a user, e.g., via display 316 of first appliance 301 or display 326 of second appliance 302, or both. In such embodiments, a user may select which appliance is to control the other appliance or appliances of appliance system 300. Upon receiving a control input, one of the controllers 318, 328 (or both) determine the primary appliance of the appliance system 300 (i.e., the appliance designated to control the other appliances). Upon determining the primary appliance of the appliance system 300, a primary command is received by the controller of the primary appliance and a secondary command is received by the controllers of the secondary appliances of the appliance system 300 (i.e., the appliances designated to be controlled by the primary appliance). In some further embodiments, to cancel or change the primary appliance, one or both of the appliances may present the "combined control option" to the user, and accordingly, the user may cancel or change the primary appliance. Advantageously, if one of the appliances of the appliance system 300 breaks down or is replaced with another appliance, the operational appliance may be operated while the user awaits the replacement appliance, and upon receipt of the new appliance, the appliances may be configured in any suitable manner and may be communicatively coupled seamlessly in a manner noted herein.

Figure 9:
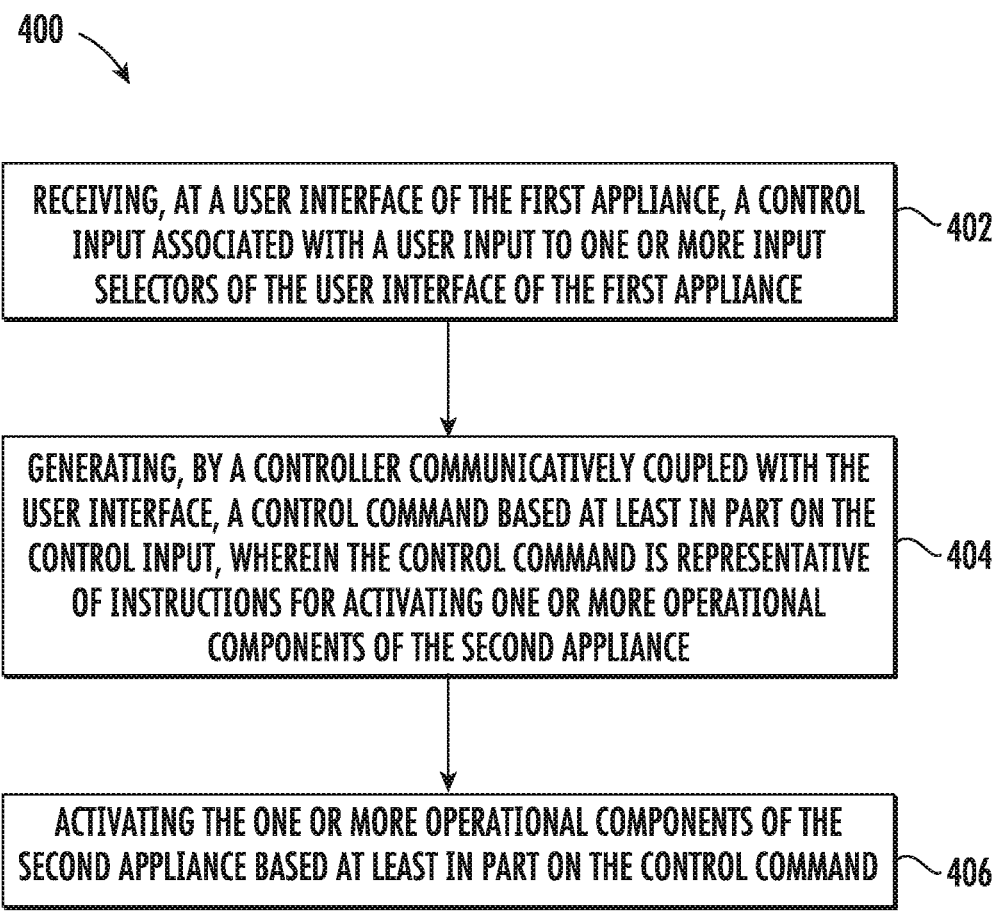
FIG. 9 provides a flow chart of an exemplary method for controlling a second appliance using a first appliance communicatively coupled thereto according to an exemplary embodiment of the present disclosure.

FIG. 9 provides a flow chart of an exemplary method (400) for controlling a second appliance using a first appliance communicatively coupled thereto according to an exemplary embodiment of the present subject matter. Method (400) is applicable to any suitable types of appliances. For example, the first appliance may be the horizontal axis washing machine appliance 100 of FIGS. 1 and 2 and the second appliance may be the dryer appliance 200 of FIGS. 1 and 2. Method (400) may be implemented by various components of the first and second appliance, e.g., such as those described above. Thus, to provide context to method (400), reference numerals indicating the features of appliance system 50 of FIGS. 1 and 2 will be utilized below.

At (402), method (400) includes receiving, at a user interface of the first appliance, a control input associated with a user input to one or more input selectors of the user interface of the first appliance. For instance, a user may provide a user input by manipulating one or more input selectors of user interface. A user may provide a user input to the user interface of the first appliance in any of the exemplary manners noted herein, for example. Based at least in part on the user input provided by the user, a control input is routed to the controller. The controller of first appliance is configured to receive the control input associated with the user input.

At (404), method (400) includes generating, by a controller communicatively coupled with the user interface, a control command based at least in part on the control input, wherein the control command is representative of instructions for activating one or more operational components of the second appliance. For instance, once the control input is received, the controller of the first appliance generates a control command based at least in part on the control input. The control command is representative of instructions for activating the one or more operational components of the second appliance. For example, the control command may be representative of activating electric heater 226, blower fan 232, and/or motor 234 of second appliance 302 (FIG. 2). Further, in some implementations, additionally or alternatively, the control command is representative of instructions for activating the one or more operational components of the first appliance.

At (406), method (400) includes activating the one or more operational components of the second appliance based at least in part on the control command. For instance, in some implementations, the operational components of the second appliance may be activated directly by the controller of the first appliance. Additionally or alternatively, in some implementations, the controller is positioned onboard the first appliance. In such implementations, method (400) further includes communicating the control command to a processing device positioned onboard the second appliance. Moreover, in such implementations, the processing device activates the one or more operational components of the second appliance at (406) based at least in part on the control command.

In some implementations of method (400), the first appliance is communicatively coupled with the second appliance by a LAN cable extending between a first connection port of the first appliance and a second connection port of the second appliance. In some implementations, the first connection port is an RJ45 port and the second connection port is an RJ45 port. In this way, data may be shared between the first and second appliances in real time. For instance, control commands may be routed to the second appliance via the LAN cable and feedback data may be routed from the second appliance to the first appliance, e.g., from a processing device of the second appliance to a controller of the first appliance.

In some implementations, after activating the one or more operational components of the second appliance at (406), the one or more operational components of the second appliance operate the second appliance in a cycle, e.g., a dryer cycle in implementations where the second appliance is a dryer appliance. In such implementations, the method further includes receiving, at the controller of the first appliance in real time, feedback data indicative of a cycle state of the cycle. Further, the method includes activating a display of the user interface to present an indicia representative of the cycle state.

As one example, feedback data may be sensed by various sensors onboard the second appliance or the one or more operational components of the second appliance. The feedback data sensed by the sensors and/or operational components may be routed to a processing device of the second appliance or may be directly routed to the controller of the first appliance. Based on the feedback data, the controller of the first appliance activates a display of the first appliance to present an indicia representative of the cycle state. For instance, if the sensors or motor driving the drum of the second appliance sense an out-of-balance load, an overload, etc., feedback data indicative of such a state may be routed to the controller and ultimately presented as an indicia on a display of the first appliance. For example, the indicia may indicate that the second appliance has been loaded with too many clothes, and accordingly, "overload at second appliance" or a like phrase may be presented to a user.

In some further implementations of method (400), after activating the one or more operational components of the second appliance at (406), the one or more operational components of the second appliance operate the second appliance in a cycle, e.g., a drying cycle. In such implementations, the method (400) further includes receiving, at the controller of the first appliance in real time, feedback data indicative of a cycle state of the cycle, e.g., the cycle being performed by the second appliance. For instance, as noted above, one example of a cycle state is that the dryer is "overloaded" with too many laundry items. In such implementations, the method (400) may further include adjusting, by the controller of the first appliance, an output of the one or more operational components of the second appliance during the cycle based at least in part on the feedback data.

For example, suppose the cycle state of the second appliance is in an overload state. Upon receiving the feedback data indicative of such a cycle state, the controller of the first appliance may determine a corrective action to attempt to alleviate or remedy the problem, e.g., the overloaded state. In such an example, the controller may generate a corrective command representative of instructions for adjusting the one or more operational components of the second appliance. The corrective command may be routed directly to the operational components of the second appliance or first through a processing device of the second appliance, which in turn would adjust the operational components of the second appliance. Further, in such implementations, a display of the user interface of the first appliance may be activated to present an indicia representative that the one or more operational components of the second appliance have been adjusted and the reasons therefore. As another example, the feedback data indicative of the cycle state of the cycle being operated by the second appliance may include information relating to the cycle options selected by the user, the time remaining on the cycle, and other useful information.

In some further implementations of method (400), after activating the one or more operational components of the second appliance at (406), the one or more operational components of the second appliance operate the second appliance in a cycle, e.g., a drying cycle. In such implementations, the method (400) further includes receiving, at the controller of the first appliance in real time, feedback data indicative of a cycle state of the cycle. Thereafter, the method (400) further includes deactivating, by the controller of the first appliance, the one or more operational components of the second appliance during the cycle based at least in part on the feedback data.

For example, suppose the second appliance is as dryer appliance and that the one or more operational components are operating the second appliance in a drying cycle. Further suppose that the controller of the first appliance receives feedback data indicative of the cycle state of the drying cycle, and that, the data indicates that the dryer is being operated in an unsafe and ineffective cycle, e.g., due to excessive lint build up. In such implementations, for example, the controller of the first appliance may deactivate the one or more operational components of the second appliance during the cycle based at least in part on the feedback data. In this way, the drying cycle may be terminated. For instance, based on the feedback data, the controller may generate a cancel command representative of instructions for deactivating the one or more operational components of the second appliance. The cancel command may be routed directly to the operational components of the second appliance or first through a processing device of the second appliance, which in turn would deactivate the operational components of the second appliance. Further, in such implementations, a display of the user interface of the first appliance may be activated to present an indicia representative that the one or more operational components of the second appliance have been deactivated and/or that the cycle of the second appliance has been canceled.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system, comprising:
  a first appliance, comprising:
    one or more operational components;
    a user interface comprising one or more input selectors;
    a controller communicatively coupled with the user interface and the one or more operational components;
  a second appliance, comprising:
    one or more operational components for operating the second appliance in a cycle, the one or more operational components of the second appliance communicatively coupled with the controller of the first appliance;
  wherein the controller of the first appliance is configured to:
    receive a control input associated with a user input to the one or more input selectors of the user interface of the first appliance;
    generate a control command based at least in part on the control input, wherein the control command is representative of instructions for controlling the one or more operational components of the second appliance; and communicate the control command to the second appliance so that the one or more operational components of the second appliance operate the second appliance in the cycle.

2. The system of claim 1, wherein the second appliance further comprises:
    a processing device for controlling the one or more operational components of the second appliance, the processing device communicatively coupled with the controller of the first appliance, wherein the processing device is configured to:
    receive the control command communicated from the controller of the first appliance; and
    activate the one or more operational components of the second appliance to operate the second appliance in the cycle based at least in part on the control command received from the controller of the first appliance.

3. The system of claim 2, wherein the controller of the first appliance is communicatively coupled with the processing device of the second appliance by a cable.

4. The system of claim 1, wherein the user interface of the first appliance further comprises:
    a display communicatively coupled with the controller;
    wherein after the controller communicates the control command to the second appliance so that the one or more operational components of the second appliance operate the second appliance in the cycle, the controller of the first appliance is further configured to:
    receive, in real time, feedback data indicative of a cycle state of the cycle; and
    activate the display to present an indicia representative of the cycle state.

5. The system of claim 4, wherein the feedback data indicative of the cycle state of the cycle relates to an operational status of the one or more operational components of the second appliance.

6. The system of claim 1, wherein the controller of the first appliance is further configured to:
    determine whether the control input is directed to controlling the first appliance or the second appliance;
    wherein the controller generates the control command based at least in part on whether the control input is directed to controlling the first appliance or the second appliance.

7. The system of claim 6, wherein the user interface of the first appliance further comprises:
    a touchscreen communicatively coupled with the controller;
    wherein the user input to the user interface is a touch input to the touchscreen, and wherein the controller of the first appliance determines whether the control input is directed to controlling the first appliance or controlling the second appliance by ascertaining a location of the touch input to the touchscreen.

8. The system of claim 6, wherein the user interface of the first appliance further comprises:
    a touchscreen communicatively coupled with the controller, the touchscreen switchable between a first appliance tab and a second appliance tab;
    wherein the user input to the user interface is a touch input to the touchscreen, and wherein the controller of the first appliance determines whether the control input is directed to controlling the first appliance or controlling the second appliance by ascertaining whether the touch input to the touchscreen occurred while the first appliance tab was presented or while the second appliance tab was presented.

9. The system of claim 1, wherein the first appliance is a washing machine appliance and the second appliance is a dryer appliance.

10. The system of claim 9, wherein the washing machine appliance defines a vertical direction, and wherein the dryer appliance is stacked on top of the washing machine appliance along the vertical direction.

11. The system of claim 9, wherein the washing machine appliance defines a lateral direction, and wherein the dryer appliance is positioned adjacent the washing machine appliance along the lateral direction.

12. The system of claim 1, wherein the second appliance further comprises:
    a processing device; and
    a user interface communicatively coupled with the processing device and comprising at least two input selectors.

13. A method for controlling a second appliance using a first appliance communicatively coupled thereto, the method comprising:
    receiving, at a user interface of the first appliance, a control input associated with a user input to one or more input selectors of the user interface of the first appliance;
    generating, by a controller communicatively coupled with the user interface and positioned onboard the first appliance, a control command based at least in part on the control input, wherein the control command is representative of instructions for activating one or more operational components of the second appliance; and
    activating the one or more operational components of the second appliance based at least in part on the control command.

14. The method of claim 13, wherein the method further comprises:
    communicating the control command to a processing device positioned onboard the second appliance, and wherein the processing device activates the one or more operational components of the second appliance based at least in part on the control command.

15. The method of claim 13, wherein after activating the one or more operational components of the second appliance, the one or more operational components of the second appliance operate the second appliance in a cycle, and wherein the method further comprises:
    receiving, at the controller of the first appliance in real time, feedback data indicative of a cycle state of the cycle; and
    activating a display of the user interface to present an indicia representative of the cycle state.

16. The method of claim 13, wherein the first appliance is communicatively coupled with the second appliance by a LAN cable extending between a first connection port of the first appliance and a second connection port of the second appliance, and wherein the first connection port is an RJ45 port and the second connection port is an RJ45 port.

17. The method of claim 13, wherein after activating the one or more operational components of the second appliance, the one or more operational components of the second appliance operate the second appliance in a cycle, and wherein the method further comprises:
    receiving, at the controller of the first appliance in real time, feedback data indicative of a cycle state of the cycle; and adjusting, by the controller of the first appliance, an output of the one or more operational components of the second appliance during the cycle based at least in part on the feedback data.

18. The method of claim 13, wherein after activating the one or more operational components of the second appliance, the one or more operational components of the second appliance operate the second appliance in a cycle, and wherein the method further comprises:
receiving, at the controller of the first appliance in real time, feedback data indicative of a cycle state of the cycle; and
deactivating, by the controller of the first appliance, the one or more operational components of the second appliance during the cycle based at least in part on the feedback data.

19. A system, comprising:
a washing machine appliance, comprising:
one or more operational components;
a user interface comprising one or more input selectors;
a controller communicatively coupled with the user interface and the one or more operational components;
a dryer appliance, comprising:
one or more operational components for operating the dryer appliance in a cycle, the one or more operational components of the dryer appliance communicatively coupled with the controller of the washing machine appliance;
wherein the controller of the washing machine appliance is configured to:
receive a control input associated with a user input to the one or more input selectors of the user interface of the washing machine appliance;
generate a control command based at least in part on the control input, wherein the control command is representative of instructions for controlling the one or more operational components of the dryer appliance; and
communicate the control command to the dryer appliance so that the one or more operational components of the dryer appliance operate the dryer appliance in the cycle.

20. The system of claim 19, wherein the user interface of the washing machine appliance further comprises:
a display communicatively coupled with the controller;
wherein after the controller communicates the control command to the dryer appliance so that the one or more operational components of the dryer appliance operate the dryer appliance in the cycle, the controller of the washing machine appliance is further configured to:
receive, in real time, feedback data indicative of a cycle state of the cycle, wherein the feedback data indicative of the cycle state of the cycle relates to an operational status of the one or more operational components of the dryer appliance; and
activate the display to present an indicia representative of the cycle state.

* * * * *